US011098997B2

(12) United States Patent
Lau et al.

(10) Patent No.: US 11,098,997 B2
(45) Date of Patent: Aug. 24, 2021

(54) INTERFEROMETRIC DISTANCE MEASUREMENT BASED ON COMPRESSION OF CHIRPED INTERFEROGRAM FROM CROSS-CHIRPED INTERFERENCE

(71) Applicant: AP Robotics, LLC, Rockville, MD (US)

(72) Inventors: Kam C. Lau, Potomac, MD (US); Yongwoo Park, Frederick, MD (US)

( * ) Notice: Subject to any disclaimer, the term of this patent is extended or adjusted under 35 U.S.C. 154(b) by 0 days.

(21) Appl. No.: 16/594,394

(22) Filed: Oct. 7, 2019

(65) Prior Publication Data

US 2020/0033112 A1 Jan. 30, 2020

Related U.S. Application Data

(62) Division of application No. 15/343,918, filed on Nov. 4, 2016, now Pat. No. 10,436,569.

(60) Provisional application No. 62/252,065, filed on Nov. 6, 2015.

(51) Int. Cl.
*G01B 9/02* (2006.01)
*G01B 11/14* (2006.01)

(52) U.S. Cl.
CPC ......... *G01B 9/02* (2013.01); *G01B 9/02004* (2013.01); *G01B 9/0209* (2013.01); *G01B 9/02041* (2013.01); *G01B 9/02084* (2013.01); *G01B 11/14* (2013.01)

(58) Field of Classification Search
CPC ........... G01B 9/02044; G01B 9/02084; G01B 9/0209; G01B 11/14
See application file for complete search history.

(56) References Cited

U.S. PATENT DOCUMENTS

| | | | | |
|---|---|---|---|---|
| 7,518,729 B2* | 4/2009 | Drabarek | ............. | G01B 9/0209 356/479 |
| 8,094,292 B2* | 1/2012 | Park | ................... | G01B 9/0209 356/5.01 |
| 2002/0191190 A1* | 12/2002 | Cierullies | ............ | G01M 11/331 356/477 |
| 2010/0226495 A1* | 9/2010 | Kelly | ..................... | H04N 5/378 380/30 |
| 2010/0315652 A1* | 12/2010 | Yelin | ................. | G01B 9/02044 356/521 |

(Continued)

*Primary Examiner* — Michael A Lyons
(74) *Attorney, Agent, or Firm* — Benesch, Friedlander, Coplan & Aronoff LLP (57) ABSTRACT

Disclosed herein are interferometric measurement systems and methods. In one exemplary embodiment an interferometric measuring system for measuring the distance to or displacement of an object includes: a light source; an interferometer with a measuring arm and a reference arm; a dispersive medium; and a detector. The interferometer is disposed between the light source and the object. The dispersive medium is arranged to unbalance the dispersion between the measurement arm and the reference arm. The detector is arranged to detect spectrum interference from the interferometer. In one example, the dispersive medium is a chirped fiber Bragg grating. In another example, the dispersive medium is a highly dispersive optical fiber. In one example, the light source is a broadband light source, and the detector includes a spectrometer. In another example, the light source is a wavelength swept laser, and the detector includes a photodetector or a balanced photodetector.

4 Claims, 8 Drawing Sheets

(56) References Cited

U.S. PATENT DOCUMENTS

2013/0094030 A1\* 4/2013 Sherif ................ G01B 9/02091
356/517
2014/0028997 A1\* 1/2014 Cable ................. G01B 9/02067
356/51
2016/0231549 A1\* 8/2016 Bosworth .......... G02B 21/0032

\* cited by examiner

INTERFEROMETRIC DISTANCE MEASUREMENT BASED ON COMPRESSION OF CHIRPED INTERFEROGRAM FROM CROSS-CHIRPED INTERFERENCE

RELATED APPLICATION

This application is a divisional application of and claims priority to U.S. patent application Ser. No. 15/343,918, titled "Interferometric Distance Measurement Based on Compression of Chirped Interferogram from Cross-Chirped Interference," which was filed on Nov. 4, 2016, which claims priority to U.S. Provisional Patent Application Ser. No. 62/252,065, titled "Interferometric Distance Measurement System and Method Based on Compression of Chirped Interferogram from Cross-Chirped Interference," which was filed on Nov. 6, 2015, both of which are expressly incorporated by reference herein in its entirety.

FIELD OF INVENTION

The present disclosure generally relates to systems and methods for measuring distance and displacement. More specifically, the present disclosure relates to novel interferometric systems and methods for measuring distance and displacement using compression of a chirped interferogram generated from cross-chirped interference.

BACKGROUND

In a variety of commercial, industrial, and academic endeavors the accurate and precise measurement of distances is vital to accomplishing critical tasks. One metrology technique that is widely used is optical interferometry. Optical interferometric devices can be used to measure the distance to an object or surface or to measure the displacement of that object or surface over time. Such optical interferometric devices can be integrated into objects with large scale volumes to measure coordinates within that volume, particularly where a cooperative target (i.e., a target that reflect light back to a detector) is present. When no cooperative target is available, optical interferometric devices can scan a target or surface to gather information about the target or surface.

With the cooperative target, a wavelength-stabilized laser interferometer, commonly referred to as a "laser tracker," has been used for displacement measurements. Commercially available laser trackers can determine displacement by continuously counting incremental displacement, which can be determined from counting longitudinal interference fringes. Since the fringe needs to be continuously counted, the laser beam from the laser tracker must be subject to a beam tracking method that does not break the beam from the cooperative target. Such an arrangement is possible when the cooperative target is a corner cube retroreflective target with a spherical back surface for which the inner center is aligned with the center of the reflector. Such a corner cube is commonly referred to as a spherically mounted retroreflector ("SMR"). The resolution of displacement measurements are a few folds of wavelength. An optical interferometer with a stabilized helium-neon laser could provide the resolution of half the wavelength ($\lambda/2=316.5$ nm). The accuracy of the measurement depends upon the stability of the wavelength and the sensitivity of the sensors, i.e., how the accuracy of the sensor is affected by environmental factors, such as temperature, pressure, and humidity. Thus, the accuracy of distances measured with optical interferometer is reliable so long as the wavelength of light is stable and traceable with a reference light source.

Figure 1:
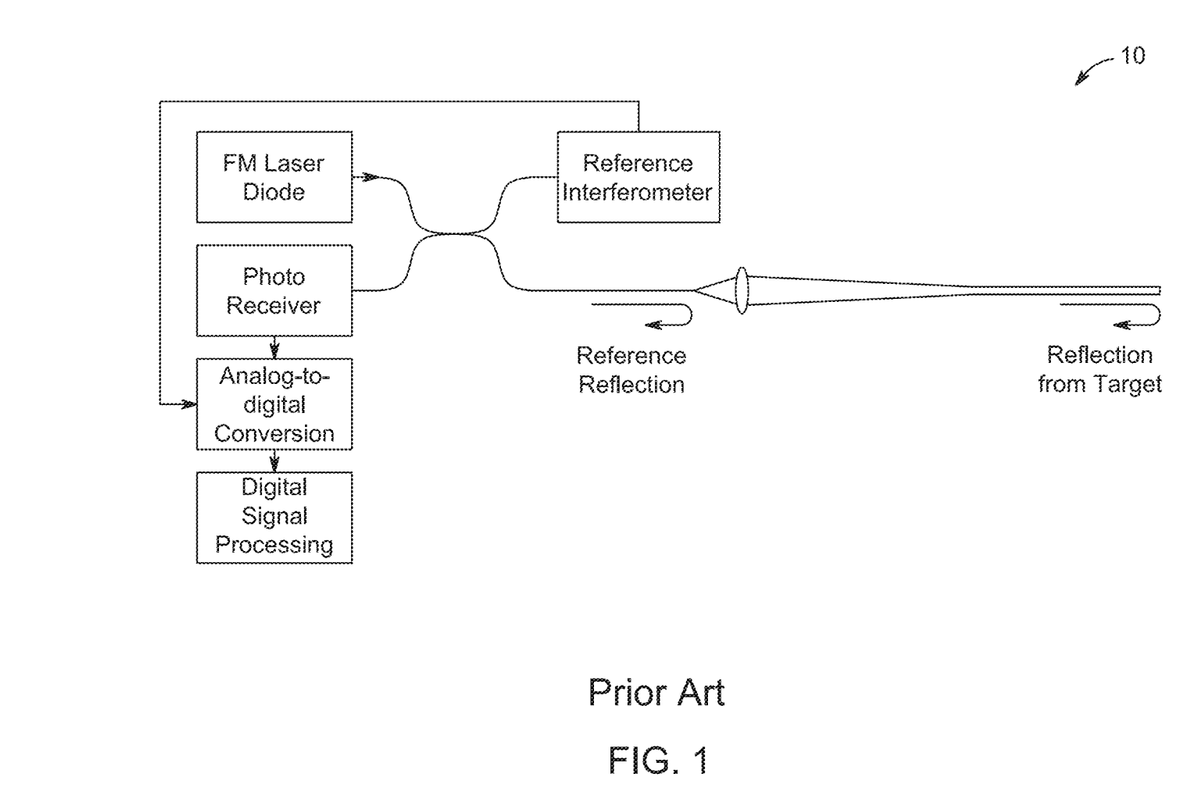
FIG. 1 schematically illustrates a frequency modulated coherent laser radar known in the art.

While the described SMR tracking interferometer with a wavelength-stabilized laser that is arranged to account for environmental conditions can provide relatively high resolution and high-speed distance measurements, to measure the absolute distance to a non-cooperative target or scan along a surface of a three-dimensional object, typically requires a broadband or wavelength-tunable light source. Frequency modulated coherent laser radar ("FM-LR") is one broadband interferometry technique that uses a wavelength-tunable light source. FIG. 1 schematically illustrates an exemplary FM-LR 10 known in the prior art.

FM-LR is generally analogous to conventional radar techniques, but is applied to the optical domain using coherence of light. In a radar system, a sweep of a radio frequency ("RF") wave is mixed with a local oscillator, which serves as a reference for the sweep. The beating frequency, defined by the frequency difference between the receiving signal and the local oscillator, provides the inverse of the time-of-flight of the receiving RF wave, which can be translated linearly into distance. In FM-LR, the optical frequency is swept in time for the sweep, where the local oscillator is created by splitting the swept source beam. The light from the measurement arm in the interferometer is combined with the local oscillator from the reference arm. If the optical path lengths from both the measurement arm and the reference arm are within the coherence length of the light source, interference will be realized in the wavelength sweep, which is proportional to the inverse of the swept wavelength linewidth.

In an example of a basic implementation, the Fourier transformation of the acquired interferogram, calibrated in optical frequency coordinate, will provide a point spread function ("PSF") of the light reflected from a target surface. For the PSF, distance information can be determined by determining the peak of the PSF. The precision of the distance determination relies on the algorithm used along with the signal-to-noise ratio ("SNR"). In general, with an SNR of 0 dB (i.e., the noise amplitude is the same as the signal amplitude), the distance repeatability in terms of the standard deviation is typically about 50 folds of the full width at half maximum ("FWHM") of the PSF.

When FM-LR is applied to non-contact volumetric metrology, typically a fast tunable light source is used. The frequency of the light source can be either externally modulated with an acousto-optic tunable filter or directly modulated by a driving current modulation. The frequency modulation bandwidth can be as high or higher than 50 GHz depending upon the frequency swept speed. The bandwidth is inversely proportional to the width of the PSF. For example, the 50 GHz band for a rectangular frequency sweep corresponds to the FWHM of the PSF of 4 mm. For direct current modulation, the linewidth, defined by the FWHM of a Gaussian spectral density of a distributed feedback laser diode could be as narrow as 5 MHz, which can be translated into a vacuum-space coherence length of 26.4 meters. At 0 dB SNR, the repeatability in standard deviation can be about 0.04 mm.

The FM-LR technique is useful because of its inherent background ambient light rejection, high sensitivity, and high resolution in a very long distance measurement range. However, due to the wave length tuning mechanism, the tuning speed needs to be significantly low in order to facilitate scanning of a three-dimensional surface of an object. For example, it may be possible to obtain sweep frequency up to 5 kHz with 50 GHz sweep bandwidth, but it would be difficult to obtain higher without compromising the resolution.

Figure 2:
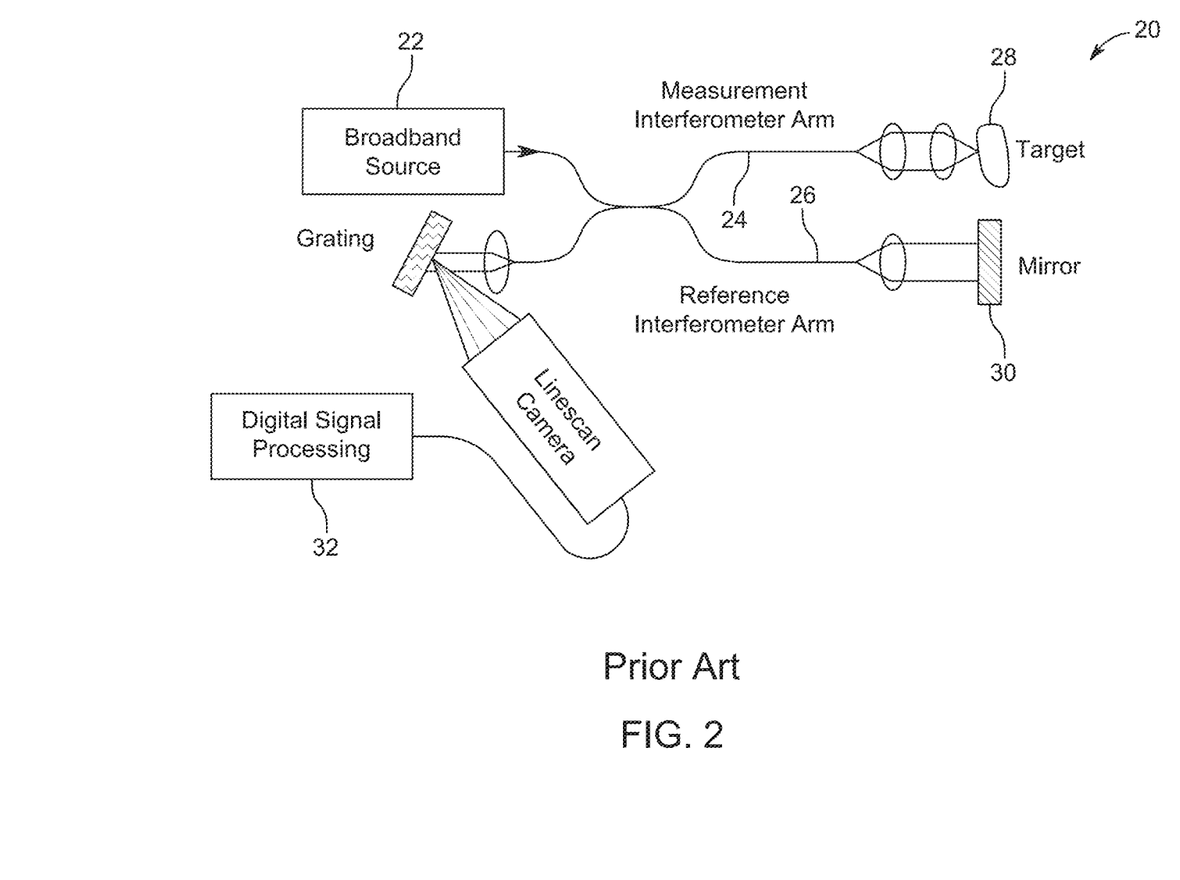
FIG. 2 schematically illustrates a spectral domain reflectometry known in the art.

Another broadband interferometry technique known in the art is spectral domain reflectometry. FIG. 2 schematically illustrates a system 20 for facilitating a spectral domain reflectometry technique. The spectral domain reflectometry technique is based on the measurement of the interference pattern between light that is emitted from a broadband source 22 and split between a measurement arm 24 and a reference arm 26 of the interferometer. As is illustrated in FIG. 2, a portion of the light emitted from the broadband source 22 is transmitted through the measurement arm 24 of the interferometer to a target 28 to be characterized, where the light is reflected off the target 28 and back through the measurement arm 24. Another portion of the light emitted from the broadband source 22 is transmitted through the reference arm 26 of the interferometer to a mirror 30, where it is reflected back through the reference arm 26. The light reflected back through the reference arm 26 is a coherent reference light, i.e., a local oscillator. The light returned from the measurement arm 24 and a reference arm 26 of the interferometer is combined and interference is measured in the frequency or wavelength domain. In order to acquire the spectral interference, which corresponds to the beating frequency information between the light returned from the measurement arm 24 and a reference arm 26 of the interferometer (the local oscillator), the method acquires the spectrum directly in the spectral domain instead of sweeping a narrow line wavelength laser. High resolution spectrometer is used for acquiring the spectrogram. A high speed line scan camera can be used for high speed measurement. The measured spectral domain information is converted into the desired length domain information by use of discrete Fourier transformation, which is calculated with signal processors 32.

Currently, affordable line-scan cameras can ramp the measurement speed up to 100,000 lines per second. Since the source does not need to be swept in optical frequency, a broadband light source, such as a light emitting diode or a super luminescent laser diode, can be used. The distance range is limited by the spectrometer resolution. For example, a high resolution of 0.06 nm at 850 nm corresponds to the coherent length of 5.3 mm in a vacuum. With a light source with 40 nm FWHM Gaussian spectrum, one can achieve 8 µm FWHM of the PSF. Because the PSF is narrow enough to determine nano-scale features, this technique is used, for example, in semiconductor parts inspection. However, due to the spectral resolution limit, this technique is not feasible for high precision volumetric measurement in metrology for industrial applications.

The aforementioned interferometers and techniques for metrology have limitations. For the prior art interferometers and techniques, range detection limits the measurement ranges based on the coherence length of the interferometer system. Such interferometers and techniques can cover either a very long range with low speed (5,000 measurements per second) and moderate repeatability (0.04 mm) for scanning, or a very short range (5.3 mm) with high speed (80 kHz) and high repeatability (80 nm), but not both. These interferometers and techniques are not suitable for covering mid-range (from about 0.1 meter to a few meters) with high speed (i.e., greater than 50,000 measurements per second) and repeatability better than 0.001 mm.

In the U.S. Pat. No. 8,094,292, titled "Cross-chirped Interferometry System and Method for Light Detection and Ranging," issued to a co-Applicant, the disclosure of which is incorporated herein by reference, an interferometric system and method are described for obtaining high-speed, high-precision and high-sensitivity time-of-flight optical range finding or position identification, which allows a direct time-of-flight to spectrum mapping to achieve spectral domain acquisition for the time-of-flight detection.

SUMMARY

Disclosed herein are interferometric measurement systems and methods. In one exemplary embodiment an interferometric measuring system for measuring the distance to or displacement of an object includes: a light source; an interferometer with a measuring arm and a reference arm; a dispersive medium; and a detector. The interferometer is disposed between the light source and the object. The dispersive medium is arranged to unbalance the dispersion between the measurement arm and the reference arm. The detector is arranged to detect spectral interference from the interferometer. In one example, the dispersive medium is a chirped fiber Bragg grating. In another example, the dispersive medium is a highly dispersive optical fiber. In one example, the light source is a broadband light source, and the detector includes a spectrometer. In another example, the light source is a wavelength swept laser, and the detector includes a photodetector or a balanced photodetector.

An exemplary method of reconstructing a point spread function numerically from an acquired localized symmetric balanced interferogram from the interferometer includes the steps of: providing an interferometer disposed between a light source and an object, and having a reference arm and a measurement arm; applying background subtraction to balance the amplitude of the interferogram; applying a high pass filter to suppress residual background spectrum; applying a Fourier domain filter in the Fourier domain to compress the chirped interferogram numerically; applying an inverse Fourier transform to determine the absolute value to construct the point spread function; and applying a peak detection algorithm to search the matched wavelength with the point spread function.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for measuring distance and displacement using compression of a chirped interferogram generated from cross-chirped interference are hereinafter disclosed and described in detail with reference made to FIGS. 1-8.

The systems and methods disclosed herein are directed to allowing the measurement of distance and/or displacement of a target or object beyond the coherent length of a light source, with signal processing to enhance detection sensitivity and distance measurement repeatability. The systems and methods disclosed herein are generally based on a dispersion unbalanced interferometer, which enables projections of light echoes from an object or target to an optical spectrum. From the optical spectrum, spectrally-encoded coherent time-of-flight can be detected with high precision. The systems and methods described herein, can be applicable, for example, for absolute distance ranging, laser three-dimensional scanning, laser radar, biomedical imaging for surgical guidance.

Disclosed herein are enhancements to cross-chirped interferometer, achieved by applying a novel numerical algorithm, a new processing schematic, and a new system configuration based on the system described in co-Applicant's above-noted earlier patent. The absolute interferometric technique and processing algorithm disclosed herein provide a laser system enabling cost effective system integration and high precision, high-speed measurement for three-dimensional object scanning.

In an exemplary embodiment, a system includes a Michelson interferometer, with a measurement arm and a reference arm, a broadband light source, and a spectrometer for acquiring spectral interferogram. A linearly chirped fiber Bragg grating is used in the interferometer reference arm so that the broadband light is reflected from the grating with a large dispersion, whereas in the measurement arm, light is reflected from a target surface without the large dispersion. The interference is made in the spectrometer in which the acquired spectrogram contains a localized chirped interferogram. The spectral center of the chirped interferogram along the wavelength indicates the physical location of the grating fringe where the particular wavelength of light reflected back interferes with the corresponding optical path length of light reflected back from the target surface. The depth of the target can be measured by determining the spectral center of the chirped interferogram.

In the co-Applicant's above-noted patent, two approaches were used for determining the spectral center. One is to extract the envelope of the chirped waveform by dithering one of the interferometer arm with a phase modulator. This approach is not suitable for high speed measurements. The other method is to collect two different interferograms with 90-degree phase shift which requires a sophisticated optical system and alignment.

In the embodiments disclosed herein, a single interferogram is acquired without using a phase modulation or an interferogram with 90-degree phase shift. Instead, the Fourier transform of the interferogram is filtered numerically by a Fourier-domain filter to compress the chirped interferogram to a transform-limited point spread function. The Fourier-domain filter can be prepared in a number of different ways. One example is to create a numerical interferogram based on the dispersion of the grating and the wavelength of the broadband source and to take its Fourier transform. This allows the use of a simple interferometer configuration as described above at high acquisition speed. Moreover, since the chirped interferogram is compressed, the signal detection sensitivity is greatly improved compared to the previous detection method.

A practical system can be configured as disclosed herein with measurement range from a millimeter to a few meters and repeatability from few nanometers to a few microns at high speed limited by either line-scan camera acquisition (e.g. greater than 80,000 lines per sec) or wavelength swept speed (e.g. greater than 200,000 sweep per sec).

Cross-chirp interference (XCI) is an interferometric technique to measure absolute distance using a linearly chirped fiber Bragg grating as a linear distance reference. Any high dispersion medium with matched delay can be used as a replacement from the grating. Such high dispersion medium includes a spool of optical fiber and diffraction grating pairs.

Figure 3:
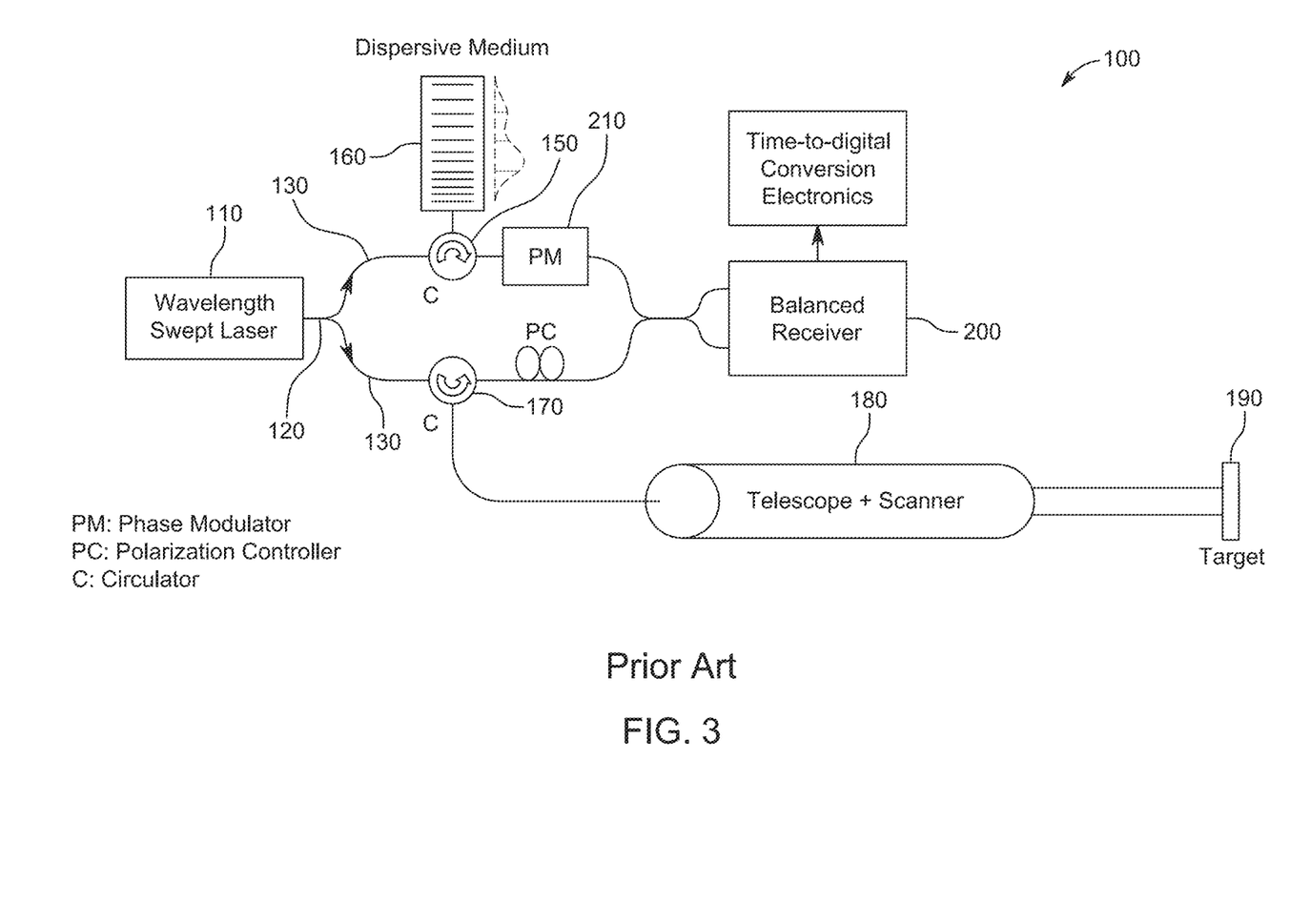
FIG. 3 schematically illustrates a cross-chirp interference (XCI) interference system according to an embodiment of this disclosure.

A known system 100 disclosed in the above-noted co-Applicant patent is schematically illustrated in FIG. 3. The system 100 includes a wavelength swept laser source 110 that emits light 120, a measurement arm 130, and a reference arm 140. The wavelength swept laser source 110 emits continuous sweeps of optical wavelength in time with a finite spectral linewidth. The light 120 from wavelength swept laser source 110 is split between the measurement arm 130 and reference arm 140. A fiber optic circulator 150 is integrated into the reference arm 140. The portion of light in the reference arm 140 is routed to a dispersion medium via the fiber optic circulator 150. In the system 100 of FIG. 3, the dispersion medium is a fiber Bragg grating 160 with large group delay dispersion, $\ddot{\Phi}_0$. The light 120 in the reference arm 140 is reflected at a local fringe of the grating, where the incident wavelength matches with the Bragg wavelength. If the fiber Bragg grating 160 is linearly chirped, the swept wavelengths will be reflected along the grating with linear depth of reflection. A fiber optic circular 170 is integrated into the measurement arm 120. The portion of light in the measurement arm 130 is routed to a beam focusing optic 180 via the fiber optic circulator 170. The light is then reflected by the target 190.

The depth of the reflection (L) with spectrum bandwidth ($\Delta\lambda$) can be defined with the following equation:

$$c \cdot \Delta\lambda \cdot \ddot{\Phi}_\lambda / 2 = L$$

where $\ddot{\Phi}_\lambda = 2\pi c \ddot{\Phi}_0 / \lambda_0^2$ c is speed of light $\lambda_0$ is wavelength of the light source In contrast to the dispersive light reflection through the reference arm 140, the light from the measurement arm 130 is reflected from the target 190 without spectral depth of reflection. If the depth of reflection in the measurement arm 130 matches with the spectral depth of reflection at a certain wavelength in the reference arm 140, interference occurs near the wavelength when the two beams are combined. The system includes a balanced receiver 200 to detect the interference. The balanced receiver can be a photodetector or a balanced photodetector. More specifically, the interference appears broadly around the matching wavelength as a symmetrically chirped waveform, i.e., the interference is visible not only on the delay matched wavelength but also on the wavelengths around the delay matched wavelength. This is due to the interference being detectable as long as the optical path length difference is comparable to the coherence length of the wavelength swept laser line. Since the matching wavelength indicates the depth of reflection, the distance measurement can be determined from the matching wavelength. The localized chirped interference moves along the wavelength as the depth of reflection from the target 190 changes, meaning that the spectral modulation frequency by the interference and its bandwidth remain the same except for the matching wavelength shift. Whereas for FM-LR, the modulation frequency increases as the depth of reflection increases and the depth is limited by the coherence length. This is the reason why the measurement range of the present XCI invention can exceed the coherence length of the light source.

One of the methods to determine the matching wavelength in the co-Applicant's above-noted patent is to extract the envelope of the chirped interferogram by modulating the phase of the reflected light with a frequency much higher than the wavelength sweep frequency. As in the system 100 in FIG. 3, a fiber optic phase modulator 210 can be used with the system 100. The envelope profile can be extracted by mixing the local oscillations. The detection sampling rate has to be at least twice as high as the modulation frequency, which is a high sampling rate. In another embodiment, a 90-degree shifted coherent photo receiver can be used with the system 100. The 90-degree shifted coherent photo receiver acquires two balanced interferences, where the modulation phase is 90-degrees shifted relative to each other. This permits the envelope profile to be extracted without the use of the phase modulator 210.

Advantages of the systems and methods disclosed herein are improvements of the distance measurement repeatability and simplification of the detection of the interferogram for obtaining the point spread function.

Figure 4:
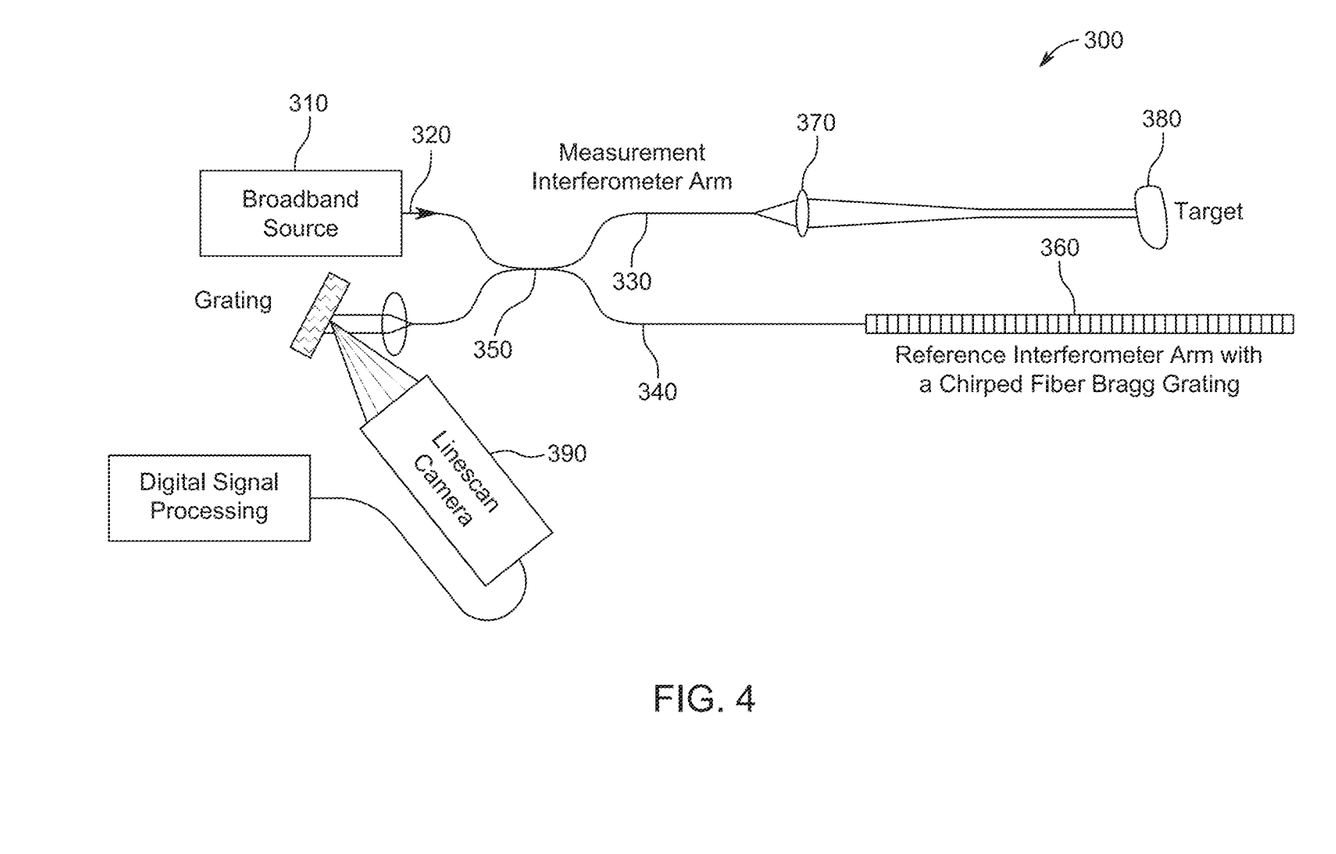
FIG. 4 schematically illustrates a system configuration using a spectrometer as an embodiment of this disclosure.

An exemplary system 300 is schematically illustrated in FIG. 4. The system 300 includes a broadband light source 310 that emits light 320 and a Michelson fiber optic interferometer with a measurement arm 330 and a reference arm 340. The broadband light source 310 can be a super luminescent diode. The broadband light source 310 emits continuous light through a fiber coupler 350. The fiber coupler 350 splits the power of the light and directs a first portion to a fiber Bragg grating 360 in the reference arm 340 and directs a second portion to beam focusing optics 370 in the measurement arm 330 and on to a target 380. Reflected light from the grating 360 is combined with the light reflected from the target 380 via the fiber optic coupler 350 and the interference is captured in the spectrometer 390. Although the system 300 of FIG. 4 illustrates a spectrometer in use with a broadband light source, if the light source is a wavelength swept laser, a single photodetector can be used by that system.

Figure 5:
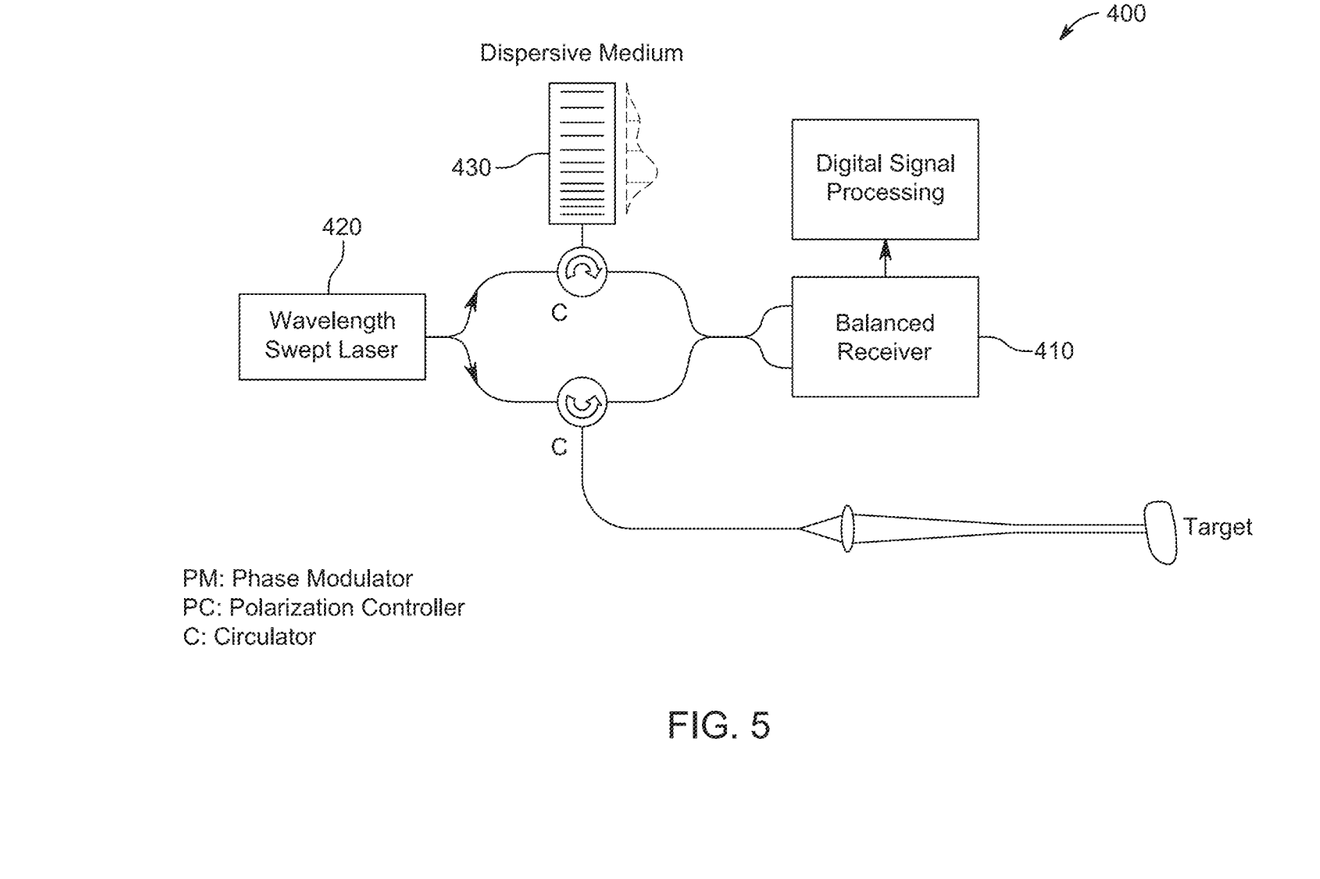
FIG. 5 schematically illustrates a system configuration using a wavelength swept laser as an embodiment of this disclosure.

Another exemplary system 400 is schematically illustrated in FIG. 5. The system 400 uses a balanced detector 410 together with the wavelength swept laser 420. In this system 400, there is no phase modulation or demodulation algorithm used. This becomes a conventional wavelength swept coherent reflectometry with the addition of the chirped fiber Bragg grating 430.

For the methods disclosed herein, there is no need to attempt to modulate or acquire additional interferograms. A numerical correlation of the chirped interferogram is performed knowing what waveform is expected to be acquired from the detector, except for the matching wavelength center. The waveform is deterministic since the chirped interferogram can be simulated based on the wavelength of the source and the dispersion of the chirped fiber Bragg grating. The correlation calculation can be implemented in the Fourier domain by multiplying the Fourier transform of the simulated interferogram, yielding a high definition, transform-limited point spread function.

Figure 6:
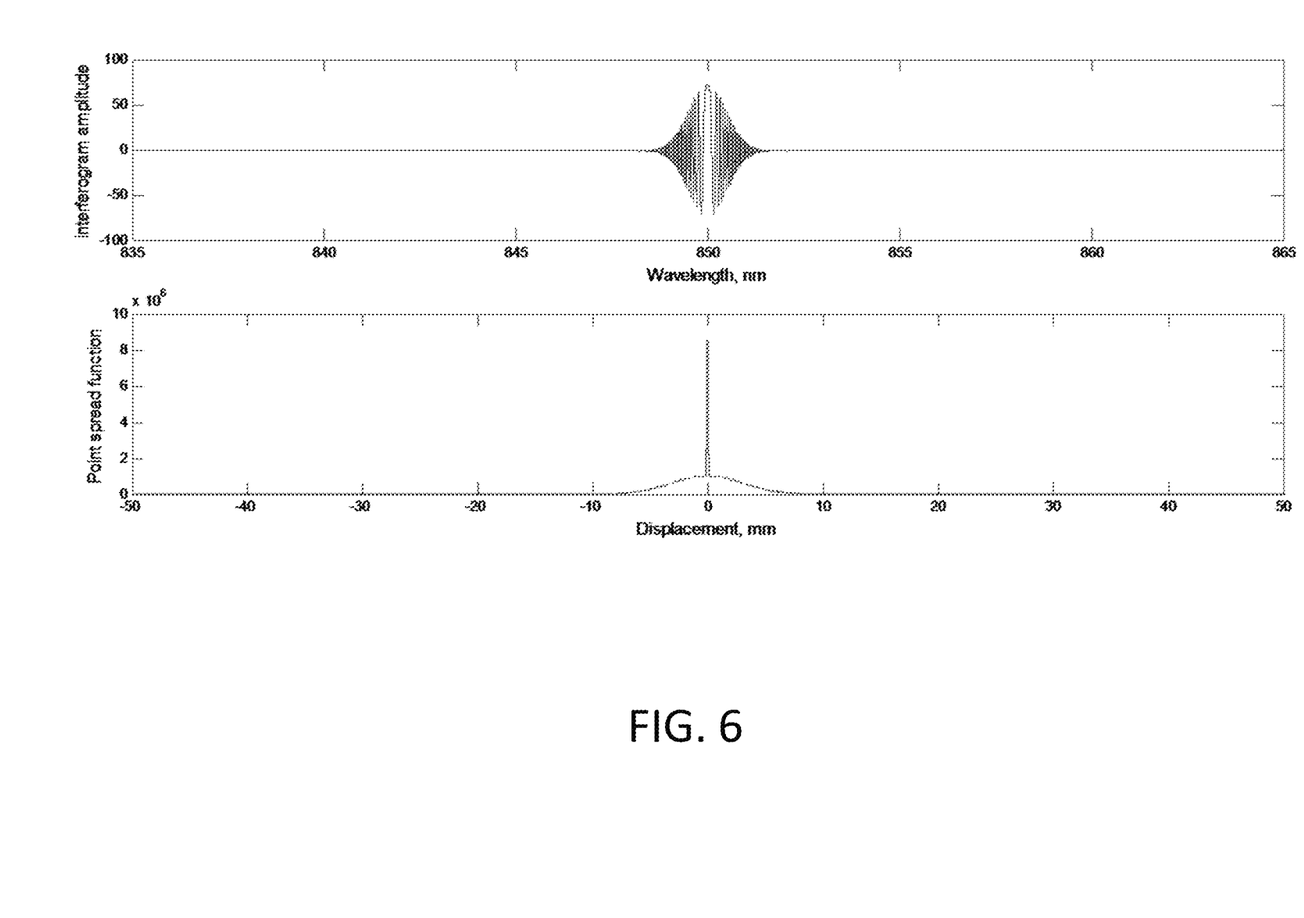
FIG. 6 illustrates a numerical example of a cross-chirped spectral interferogram which can be acquired from the interferometer and the point spread function after numerical processing.

FIG. 6 depicts two graphs. The upper graph shows the simulated waveform constructed with a Gaussian spectrum centered at 850 nm, with 30 nm FWHM, 0.06 nm spectral resolution and with the group delay dispersion of 10 ps-per-nanometer (ps/nm), and the background spectrum subtracted. The lower graph shows the self-correlation of the waveform obtained by performing the correlation in the Fourier domain, where the FWHM of the PSF is 0.14 mm. Considering that the FWHM of the interference envelope is 1.2 nm, corresponding to 1.8 mm in depth, the compression ratio (the FWHM PSF divided by FWHM envelope) is 0.07. To make this compression effective, i.e., a smaller ratio, requires a smaller spectral resolution, meaning that the optical frequency resolution should be much smaller. For example, if the spectral resolution is reduced in half, i.e. 0.03 nm, the FWHM PSF becomes 0.067 mm, whereas the FWHM envelope increases to 3.3 mm, resulting in a compression ratio of 0.02.

Figure 7:
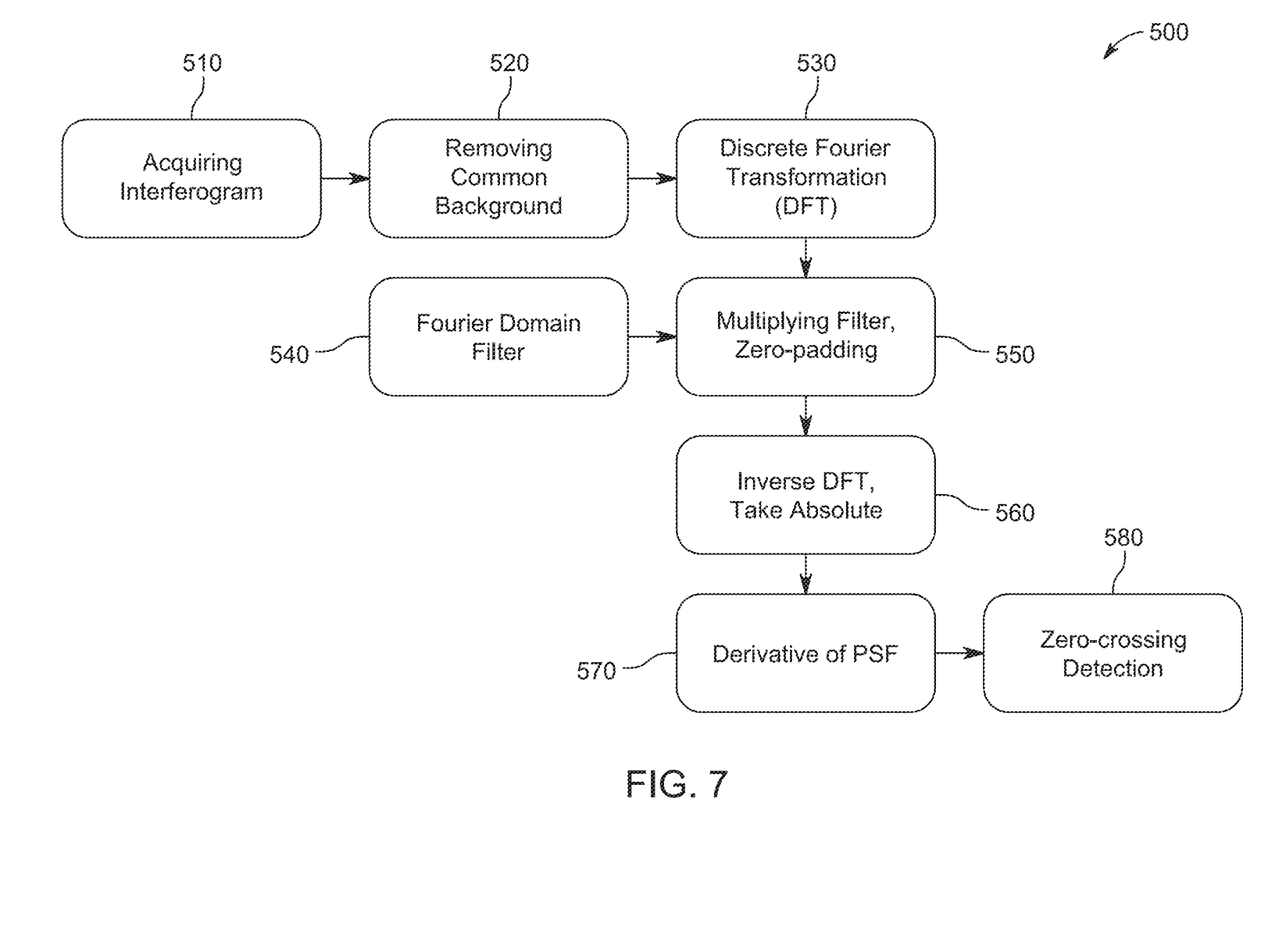
FIG. 7 illustrates a flow chart for implementing methods described herein.

The signal processing of the chirped interferogram is illustrated in the flow diagram 500 of FIG. 7. In a first step, a spectrum with a localized, symmetrically-chirped interferogram is acquired (step 510) by a photodetector, a spectrometer, or other apparatus. In the next step, a pre-acquired source spectrum is used to subtracted the background spectrum on the acquired interferogram (step 520). The background can be obtained by pre-acquiring the spectrum from the reference arm when the measurement arm is blocked and another spectrum from the measurement arm when the reference arm is blocked. The first spectrum is constant regardless of target measurement condition. The second spectrum is variable depending upon the return power from the measurement arm. The return power measurement can provide the scale of the spectrum. A numerical, high-pass filtering may be applied in addition to the background subtraction to remove residual background. A numerical example of an interferogram after the background subtraction is shown in FIG. 6. The interferogram becomes a localized, symmetrically-chirped balanced waveform with respect to optical frequency. For a calibrated spectrometer, the waveform can be directly acquired with respect to an equally-spaced wavelength that can be further interpolated into an equally paced optical frequency for converting into depth of reflection (i.e., distance). For a wavelength swept laser, a sampling clock may be used to linearize the waveform with respect to the optical frequency (or wavenumber).

The depth of reflection can be calculated for the grating linearly chirped with respect to optical frequency, for example by the following equation:

$$2\pi(f - f_s) \cdot \Phi_0 \frac{c}{2}$$

where $f_s$ is the wavelength having the shortest depth of reflection.

The Fourier transform (step 530) of the waveform is multiplied by a given complex filter (step 540), which can be obtained numerically or empirically. An interferogram may be acquired directly from the interferometer with a reflective target at the center of the depth of reflection, and the spectral background subtracted from it. The complex filter in the Fourier domain (step 540) is obtained by taking a discrete Fourier transform of the balanced interferogram with respect to the wavelength. This can be used as the Fourier domain filter for the waveform compression empirically. Another way is to create the symmetrically-chirped waveform numerically, using the following equation:

$$\exp(-f^2/(2df^2)) \cdot \cos(2\pi^2 \Phi_0 f^2)$$

where: f is the base frequency defined by (optical frequency – center frequency); and df is the interference waveform width.

A similar waveform can be found in a radar technology, the so called "synthetic aperture radar." However, it is used in radar radiation, artificially created/modulated incoherent wave, for determining the range. For the systems and methods disclosed herein, it is applied to natural coherent waveforms created in the cross-chirp interference.

Another reference waveform may be prepared separately for phase-sensitive PSF amplitude modulation. Such a waveform has its phase shifted by 90 degrees relative to the first waveform, $\exp(-f^2/(2df^2)) \cdot \sin(2\pi^2 \Phi_0 f^2)$.

Once the Fourier domain filters are multiplied to the Fourier transformed chirped interferogram yielding two complex-filtered waveforms, zero paddings may be applied to both waveforms (step 550), depending upon the sampling resolution prior to the inverse Fourier transformation, to increase the sampling resolution in wavelength (real domain). The filtering process is completed by taking absolutes of the inverse discrete Fourier transformation of the filtered Fourier waveform (step 560). The square root of the squared sum of the inversely-transformed waveforms is shown in the bottom graph of FIG. 6. When the waveform compression is effective (i.e., smaller compression ratio), the PSF amplitude is stable and does not require the second reference waveform to be applied. However, in case the compression is less effective (i.e., higher compression ratio), the additional processing with the 90-deg shifted reference waveform helps the PSF amplitude to be less modulated by the interference fringe shift.

There are many different methods to determine the peak of the PSF. One example is to take the derivative of the PSF (step 570) or high-pass filter to reform it into a doublet pulse where the center of the pulse profile crosses zero amplitude (step 580). A linear fitting may be applied to determine zero-crossing wavelength ($\lambda$). The zero-crossing wavelength is converted into the depth of reflection. Alternatively, direct quadratic fit may be directly applied to the PSF instead of the derivative.

Figure 8:
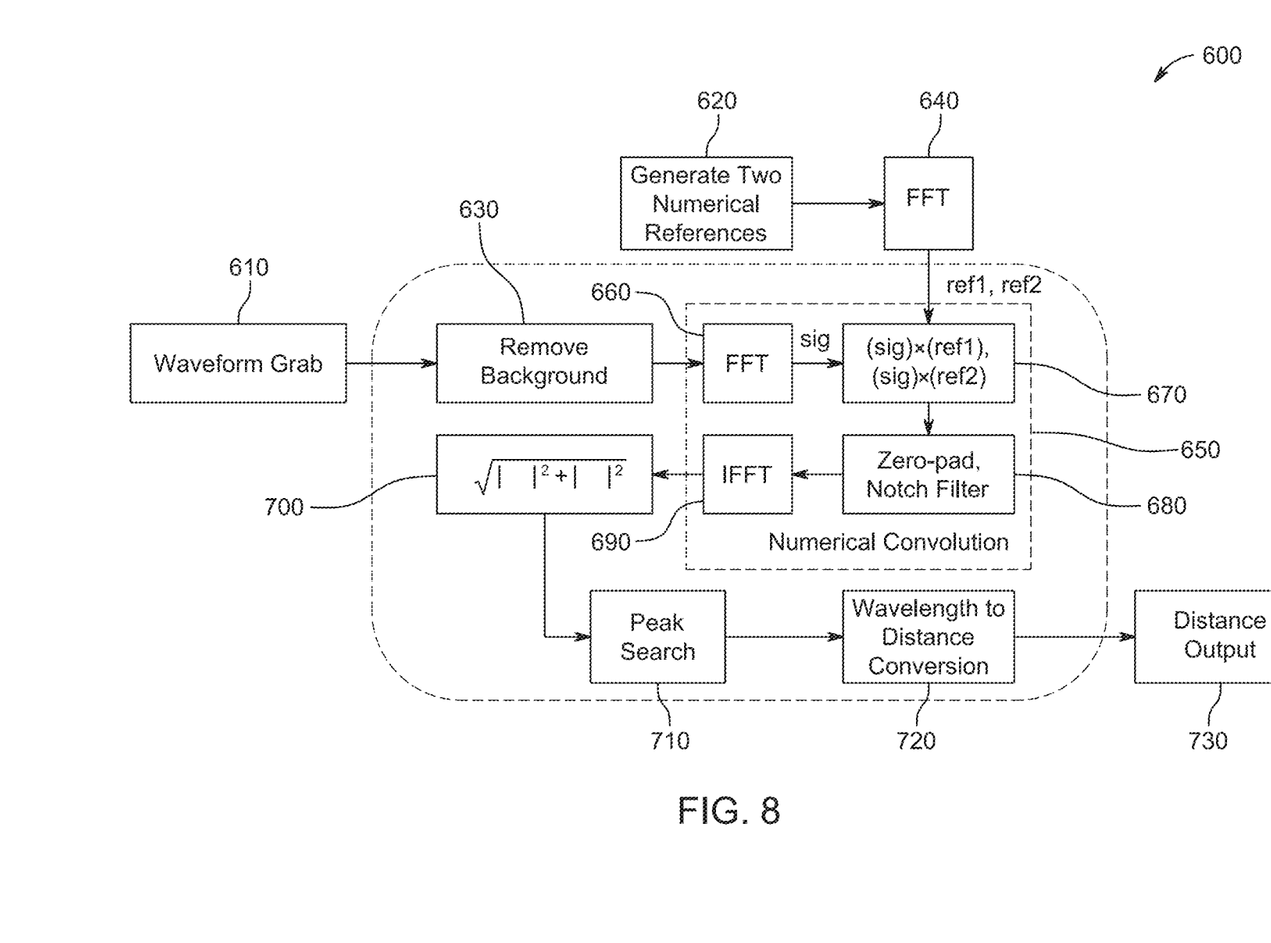
FIG. 8 illustrates a functional block diagram of signal processing as described herein.

FIG. 8 illustrates an exemplary block diagram 600 for implementing the systems and methods disclosed herein. As illustrated, an interferogram is acquired 610, and two numerical references are generated 620. The background is removed 630 from the interferogram, and a Fourier transform 640 is applied to the two numerical references. The output of both processes are passed to a numerical convolution process 650. In the numerical convolution process 650, a Fourier transform 660 is applied the modified interferogram, and the result is combined 670 with the two numerical references. The result is passed through a zero-pad and a notch filter 680 and then an inverse discrete Fourier transform 690 is applied to yield a result 700. A peak search 710 is applied to the result, and a wavelength to distance conversion 720 is performed, which yields a distance output 730.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A method for reconstructing a point spread function, comprising the steps:

providing an interferometer disposed between a light source and an object, where the interferometer includes a reference arm and a measurement arm;

acquiring a localized symmetrically balanced interferogram from the interferometer, and performing the following steps to the localized symmetrically chirped balanced interferogram;

applying a background subtraction to balance an amplitude of the interferogram;

applying a high pass filter to the interferogram to suppress residual background spectrum; and applying a Fourier domain filter in the Fourier domain to compress the interferogram numerically.

2. The method of claim 1, wherein the Fourier domain filter is prepared numerically by knowing a spectrum of light source and a group delay dispersion of a dispersive medium.

3. The method of claim 1, wherein the Fourier domain filter is poisoned near the reference arm of the interferometer.

4. The method of claim 1, further comprising the step of:

applying the inverse Fourier transform to the interferogram and taking the absolute value of the result.

* * * * *